(12) United States Patent
Malz et al.

(10) Patent No.: US 7,147,506 B2
(45) Date of Patent: Dec. 12, 2006

(54) FLAT FILM CONDUCTORS COMPRISING THERMOPLASTIC POLYURETHANE

(75) Inventors: Hauke Malz, Diepholz (DE); Christa Hackl, Bad Essen (DE); Alfons Bertels, Diepholz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/511,703

(22) PCT Filed: Apr. 22, 2003

(86) PCT No.: PCT/EP03/04119

§ 371 (c)(1),
(2), (4) Date: Oct. 15, 2004

(87) PCT Pub. No.: WO03/091322

PCT Pub. Date: Nov. 6, 2003

(65) Prior Publication Data

US 2005/0187320 A1 Aug. 25, 2005

(30) Foreign Application Priority Data

Apr. 26, 2002 (DE) ................. 102 18 911

(51) Int. Cl.
*H01R 12/00* (2006.01)
*H01R 12/24* (2006.01)
*H01R 12/26* (2006.01)

(52) U.S. Cl. ............ 439/498; 524/100; 524/189; 524/349; 524/350; 524/351

(58) Field of Classification Search .......... 524/189, 524/349–361, 100; 439/77, 498; 174/117 F–117 FF; 428/425.8

See application file for complete search history.

(56) References Cited

U.S. PATENT DOCUMENTS

| | | | | |
|---|---|---|---|---|
| 4,677,154 A | * | 6/1987 | Narayan et al. | 524/710 |
| 4,976,889 A | | 12/1990 | Aumueller et al. | 252/403 |
| 5,061,830 A | * | 10/1991 | Ambrose | 200/5 A |
| 5,650,205 A | * | 7/1997 | Shukushima | 428/35.8 |
| 6,242,097 B1 | * | 6/2001 | Nishiguchi et al. | 428/383 |
| 6,411,248 B1 | | 6/2002 | Barbour et al. | 428/403 |
| 6,483,048 B1 | * | 11/2002 | Bontrager et al. | 200/5 R |
| 6,492,595 B1 | * | 12/2002 | Sexton | 174/117 F |

FOREIGN PATENT DOCUMENTS

| | | |
|---|---|---|
| DE | 130088 | 3/1978 |
| EP | 0 189 130 | 7/1986 |
| EP | 0 381 125 | 8/1990 |
| EP | 0 617 079 | 9/1994 |
| EP | 1 026 206 | 8/2000 |

OTHER PUBLICATIONS

Matsuda, Yutaka. "Manufacture of fire-resistant silane-crosslinked polyolefins", Chemical Abstracts Service, Database accession No. 131:88624, XP002262882, English abstract only 1999.
Edited by Dr. Hans Zweifel, "Antioxidants", Appendix A: Chemical Structures, CAS—Numbers, Producers and Tradenames of Stabilizers, Plastics Additives Handbook, 5th ed., pp. 98-113, 122-137 2001.

* cited by examiner

*Primary Examiner*—Peter Szekely
(74) *Attorney, Agent, or Firm*—Oblon, Spivak, McClelland, Maier & Neustadt, P.C.

(57) ABSTRACT

The invention relates to flat film conductors comprising thermoplastic polyurethane and stabilised thermoplastic polyurethane comprising antioxidants and metal deactivators, preferably for use in flat film conductors.

14 Claims, 1 Drawing Sheet

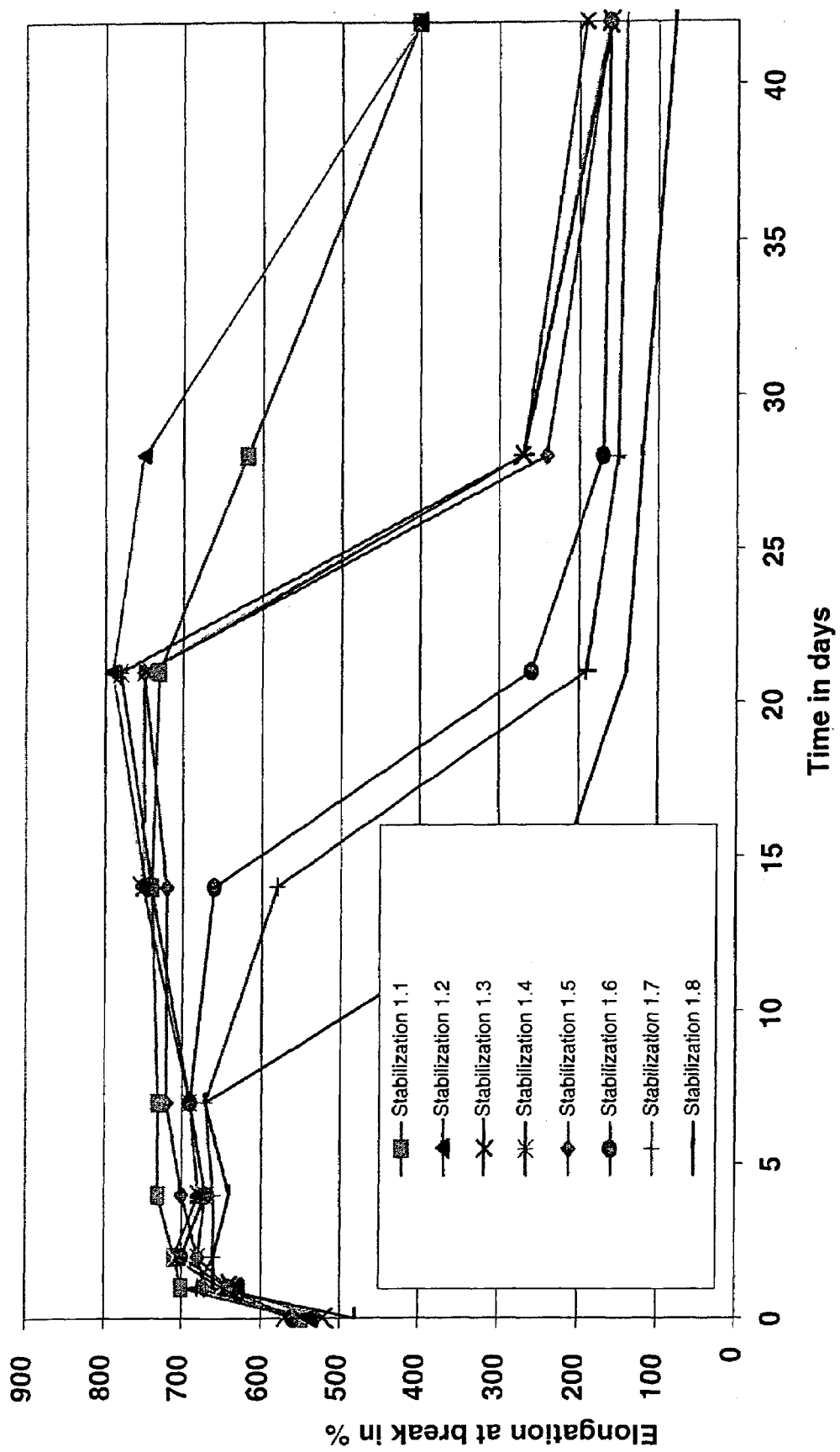

FLAT FILM CONDUCTORS COMPRISING THERMOPLASTIC POLYURETHANE

This application is a national stage application of International Patent Application No. PCT/03/04119 filed on Apr. 22, 2003, and claims priority to German Patent Application No. 102 18 911.0, filed on Apr. 26, 2002, both of which are incorporated herein by reference in their entireties.

The present invention relates to film-laminated flat conductors comprising thermoplastic polyurethane and stabilized thermoplastic polyurethane, comprising antioxidants and metal deactivators, preferably for use in film-laminated flat conductors.

Thermoplastic polyurethane (referred to below as TPU) is an elastomer which is used in many applications, for example shoe applications, films, ski boots and hoses. Cable sheaths constitute a major market for TPU. Here, insulated copper wires are twisted together and then sheathed with TPU. A very wide range of materials, for example PVC or EVA, is used as insulating material for the copper wires. For some applications, TPU is also suitable for the insulation. The sheath in turn is then generally produced from TPU.

Although the wide use of TPU is based on its good chemical stability, it is advantageous additionally to stabilize the product by introducing additives to prevent damage by heat or UV light. Conventional stabilizers for this purpose are, for example, phenolic antioxidants, hindered amine stabilizers and UV absorbers, various stabilizer classes being used in combination for good UV stabilization.

Furthermore, it is often of interest to reduce the flammability of the TPU and, for example, to produce self-extinguishing cables which do not drip flaming particles. Particularly in cable applications, the incorporation of flame-retardant additives is therefore frequently important. In order to reduce the flammability, flameproofing agents are added to the TPU. Examples of these flame-retardant additives are both compounds which contain halogens, such as chlorine and bromine, and halogen-free flameproofing agents, e.g. phosphoric esters and melamine derivatives. The use of halogen-free flameproofing agents is described in EP-A-617079 and EP-A-189130. The addition of the products can, however, also have an adverse effect on the mechanical properties of the resulting TPU molding materials, for example reduced temperature and heat resistance, especially in the presence of various metals, for example copper.

In modern automobiles, electrical consumers and sensors are increasingly being used. As a result, the number of electrical cables required also increases. This leads to increasingly bulky and complicated cable trees. The increase in weight in the automobile through these cable trees and the susceptibility to faults owing to confusion when connecting cables is, however, undesirable. A development which avoids these disadvantages comprises flat conductors or film-laminated flat conductors.

In this new conductor generation, a plurality of parallel copper strips are insulated from one another or from the environment by two films of plastic. This gives a flat flexible conductor strip which is distinguished by good processing, for example in roofs, low weight, economical production and simple connection.

Owing to their use, for example, in automotive construction, the film-laminated flat conductors have to meet a whole range of requirements with respect to their mechanical, chemical and thermal resistance. It is an object of the present invention to provide a polymer which can advantageously be used for the production of film-laminated flat conductors.

Owing to the design, however, the contact surface between the copper material and the TPU material is particularly large in a film-laminated flat conductor. Moreover, the wall thickness is very small so that destabilization of the TPU by the copper has a considerable effect. It is a further object of the present invention to provide a polymer for the production of film-laminated flat conductors which has high resistance, and in particular high aging resistance, to copper, both when heat is supplied and during storage in water. This also applies in particular when flameproofing agents are added.

We have found that these objects are achieved by film-laminated flat conductors which are composed of thermoplastic polyurethane which preferably contains an additive mixture comprising an antioxidant (component i) and a metal deactivator (component ii) and, if required, a flameproofing agent (component iii).

The present invention therefore relates to TPU-containing film-laminated flat conductors and stabilized TPU, comprising (i) antioxidants and (ii) metal deactivators, and the use of the novel TPU for the production of film-laminated flat conductors.

The present invention also relates to a metal deactivator concentrate for the preparation of the novel thermoplastic polyurethanes, comprising thermoplastic polyurethane and metal deactivators (ii) in an amount of from more than 2.5 to 40% by weight, based on the total weight of the thermoplastic polyurethane.

The present invention furthermore relates to a process for the production of novel film-laminated flat conductors by providing two TPU films and then laminating metal strips between the two films or by coextruding TPU films with metal strips.

The present invention furthermore relates to the use of the novel film-laminated flat conductors in means of transport, machines and/or electrical articles, and means of transport, machines and/or electrical articles comprising the novel film-laminated flat conductors.

Suitable antioxidants which constitute the component (i) in the novel stabilized TPU are in general substances which retard or prevent undesired oxidation processes in the plastic to be protected. In general, antioxidants are commercially available. Examples of antioxidants are sterically hindered phenols, aromatic amines, thiosynergists, organophosphorus compounds of trivalent phosphorus and hindered amine light stabilizers. Examples of sterically hindered phenols are to be found in Plastics Additive Handbook, 5th edition, H. Zweifel, ed, Hanser Publishers, Munich, 2001 ([1]), pages 98–107 and pages 116–121. Examples of aromatic amines are to be found in [1], pages 107–108. Examples of thiosynergists are given in [1], pages 104–105 and pages 112–113. Examples of phosphites are to be found in [1], pages 109–112. Examples of hindered amine light stabilizers are given in [1], pages 123–136. Phenolic antioxidants are preferably used in the novel mixture of antioxidants.

In a preferred embodiment, the antioxidants (i), in particular the phenolic antioxidants, have a molar mass of more than 350, particularly preferably more than 700, g/mol and a maximum molar mass of <10 000, preferably <3 000, g/mol. Furthermore, they preferably have a melting point of less than 180° C., particularly preferably less than 130° C. Moreover, antioxidants which are amorphous or liquid are preferably used. Mixtures of two or more antioxidants may also be used as component (i).

The abovementioned boundary conditions regarding molar mass and melting point ensure that the antioxidant does not volatilize even in the case of high surface area/volume ratios and that the antioxidant can be uniformly and homogeneously incorporated into the TPU during the synthesis. Examples of suitable phenolic antioxidants are molecules which contain the structure 1 as an active ingredient group.

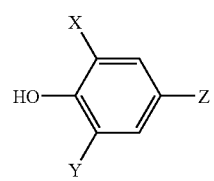

1 where X and Y, independently of one another, are a hydrogen atom or straight-chain, branched or cyclic alkyl radicals of 1 to 12 carbon atoms and Examples of preferred phenolic antioxidants which contain the active ingredient group 1 are triethylene glycol bis(3-(5-tert-butyl-4-hydroxy-m-tolyl)propionate) (Irganox® 245, Ciba Spezialitätenchemie AG), hexamethylene bis(3-(3,5-di-tert-butyl-4-hydroxyphenyl)propionate) (Irganox® 259), pentaerythrityl tetrakis(3-(3,5-bis(1,1-dimethylethyl)-4-hydroxyphenyl) propionates) (Irganox® 1010), octadecyl 3-(3,5-di-tert-butyl-4-hydroxyphenyl)propionate (Irganox® 1076), N,N'-hexamethylenebis(3,5-di-tert-butyl-4-hydroxy-hydrocinnamide) (Irganox® 1098), phenol, 2,4-dimethyl-6-(1-methylpentadecyl)+octadecyl 3-(3,5-di-tert-butyl-4-hydroxy-phenyl)propionate (Irganox® 1141),
2-tert-butyl-6-(3-tert-butyl-2-hydroxy-5-methylbenzyl)-4-methylphenyl acrylate (Irganox® 3052) and CAS No. 125643-61-0 (Irganox® 1135).

Particularly preferred phenolic antioxidants are Irganox® 1010, Irganox® 245, Irganox®259 and antioxidants based on polyetherols.

Antioxidants which can be described by the general formulae 3 A and 3 B are furthermore particularly preferred.

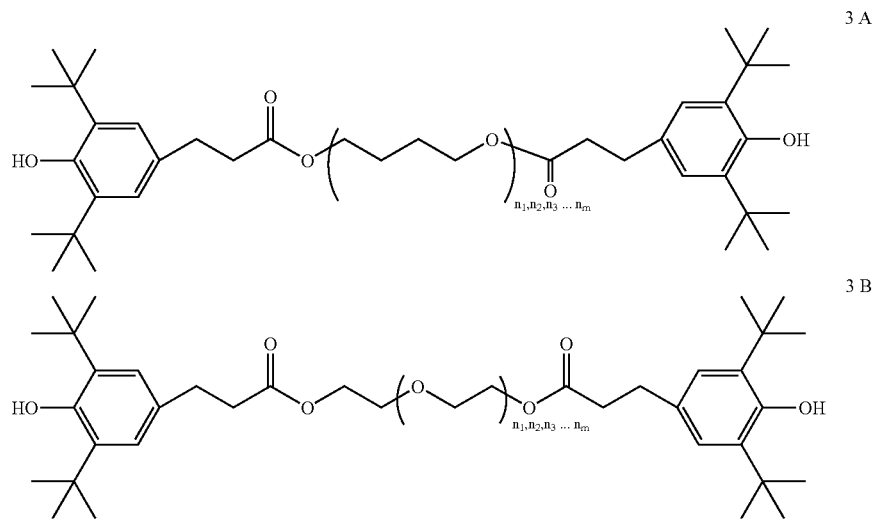

Z is a covalent bond via which the active ingredient group is bonded to the remaining molecule of the antioxidant (i).

Preferably used phenolic antioxidants (i) are compounds which contain the radical 2.

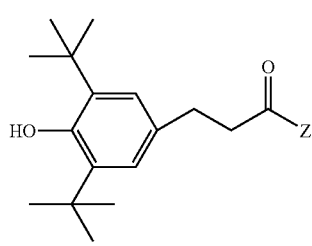

2 where Z is as defined above.

In the formulae 3 A and 3 B, $n_1, n_2, n_3 \ldots n_m$ are integers >0 and the relationships $n_2=n_1+1$, $n_3=n_2+1$, $n_{x+1}=n_x+1$, etc. apply.

The preferred antioxidants 3 A and 3 B are accordingly mixtures of different compounds which differ only in the magnitude of n and are referred to below as antioxidant mixture. The proportion of the molecules $n_1, n_2, n_3$ to $n_m$ is chosen so that the number average molar mass of the antioxidant mixture corresponds to the molar mass recognized as being advantageous. A proportion of the molecules $n_1, n_2, n_3$ to $n_m$ is preferably chosen so that the number average molar mass of the antioxidant mixture 3 A and/or 3 B is greater than 350, particularly preferably >700, g/mol and <10 000, preferably <3 000, g/mol.

In a further preferred embodiment, antioxidant mixtures used are those whose polydispersity $P_d$ is greater than 1, i.e. their number average molar mass is less than their weight average molar mass. This is fulfilled, for example, when the antioxidant consists of a mixture of different molecules of the structure 3 A or 3 B with different n.

It may be advantageous if, instead of a single phenolic antioxidant, a mixture of phenolic antioxidants is used for stabilization. In principle, all phenolic antioxidants which comply with the conditions described above with respect to molar mass and melting point can be used for such mixtures.

Mixtures which contain Irganox® 1010 and/or those mixtures which contain phenolic antioxidants according to the formulae 3 A and 3 B are particularly preferred.

Metal deactivators are used as component (ii). Metal ions generally catalyze the decomposition of peroxides and thus accelerate the degradation of polymers; consequently, metal deactivators are substances which prevent the harmful effect of metal ions with regard to the degradation of polymers, for example through complexing of these metal ions. Examples of metal deactivators are 2-(2-benzimidazolyl)phenol, 3-(2-imidazolin-2-yl)-2-naphthol, 2-(2-benzoxazolyl)phenol, 4-diethylamino-2,2'-dioxy-5-methylazobenzenes, 3-methyl-4-(2-oxy-5-methylphenylazo)-1-phenyl-5-pyrazolones, tris(2-tert-butyl-4-thio(2'methyl-4'hydroxy-5'tert-butyl)phenyl-5-methyl)phenyl phosphite, decamethylenedicarboxydisalicyloylhydrazides, 3-salicyloylamino-1,2,4-triazole, 2',3-bis-((3-(3,5-di-tert-butyl-4-hydroxyphenyl)propionyl))propionhydrazide and 2,2'-oxamidobis(ethyl-3-(3,5-di-tert-butyl-4-hydroxyphenyl) propionates). In general, derivatives of hydrazine, such as adipic acid dihydrazide or oxalic acid dihydrazide, and derivatives of oxamide may furthermore act as metal deactivators.

However, it has surprisingly been found that particularly good results are obtained with metal deactivators which are triazole and hydrazine derivatives of salicylaldehyde, for example those metal deactivators which have the structure 4.

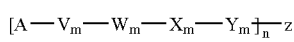

In structure 4, A is a salicylaldehyde radical according to formula 4.2,

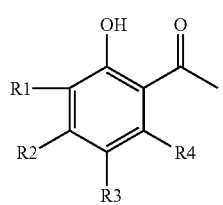

R1–R4, independently of one another, are H, OH, halogen, $NO_2$, $NH_2$, a linear, branched or cyclic C1–C12 alkyl radical, a linear, branched or cyclic C1–C12 alkenyl, a linear, branched or cyclic C1–C12 alkynyl radical or haloalkyl radical, a linear, branched or cyclic C1–C12 alkoxy radical, a linear, branched or cyclic C1–C12 alkylamino radical, containing primary and/or secondary and/or tertiary amines, a linear, branched or cyclic C1–C12 alkylthio radical or a linear, branched or cyclic C1–C12 alkoxycarbonyl radical.

$V_m$ in formula 4 is a triazole radical according to formula 4.3

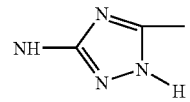

or a hydrazine radical according to formula 4.4,

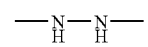

$W_m$ and $Y_m$ in formula 4 are absent or, independently of one another, are a carbonyl group, $X_m$ is absent or is a hydrogen atom, a linear or branched C1–C30 alkylene radical, a linear, branched or cyclic C1–C30 alkenyl radical, a linear, branched or cyclic C1–C30 alkynylene radical, a linear, branched or cyclic C1–C30 alkoxy radical or a linear, branched or cyclic C1–C30 alkylamino radical containing primary amino groups.

z is optional and is a hydrogen atom, a halogen atom, a carbon atom, an oxygen atom, a sulfur atom, a nitrogen atom, an $NH_{3-o}$ group, a phosphorus atom, a methyl radical, a methenyl radical, a methynyl radical, a monovalent, divalent or trivalent to hexavalent diol radical, for example a diol radical of 2 to 14, preferably 4 to 10, carbon atoms, e.g. ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone, a triol radical, such as 1,2,4- or 1,3,5-trihydroxycyclohexane, glycerol and trimethylolpropane, or alcohols having a higher OH functionality, such as pentaerythritol or sucrose, or an amino alcohol or diamine radical, for example ethylenediamine, 1,2-propanediamine, 1,3-propanediamine, tetramethylenediamine, 2-methyl-1,5-diaminopentane, 1-methyl-2,4-diaminocyclohexane, 1,2-diaminocyclohexane, 1,3-diaminocyclohexane, 1,4-diaminocyclohexane or isophoronediamine.

In formula 4, n is an integer from 1 to 6,
m is an integer from 1 to n and
o in the expression $NH_{3-o}$ is an integer from 1 to 3.

Examples of the preferred above structures are decamethylenedicarboxydisalicyloylhydrazides (ADK Stab CDA 6®) and 3-salicyloylamino-1,2,4-triazole (ADK Stab CDA 1®) according to formulae 5 and 6.

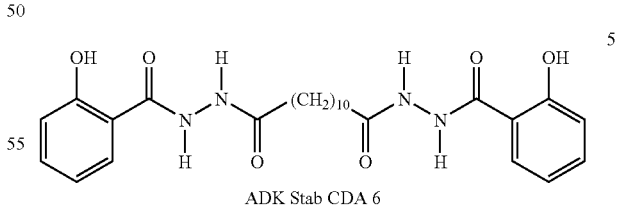

ADK Stab CDA 6

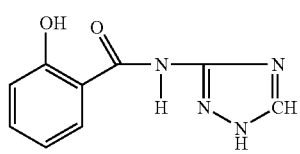

ADK Stab CDA 1

ADK Stab CDA 6 is particularly preferred.

It may be advantageous to use mixtures of metal deactivators instead of a single metal deactivator. Mixtures which contain ADK Stab CDA 1 or ADK Stab CDA 6 are preferred, in particular those mixtures which contain ADK Stab CDA 6.

In an embodiment of the present invention, the two stabilizing components (i) antioxidant and (ii) metal-deactivating component may be combined in one molecule. Examples of such a stabilizer are 2,2'-oxamidobis(ethyl-3-(3,5-di-tert-butyl-4-hydroxyphenyl)propionates) and N,N'-bis(3-(3',5'-di-tert-butyl-4'-hydroxylphenyl)propionylhydrazides).

For stabilizing thermoplastic polyurethanes, the components (i) and (ii) and, if required, (iii) are incorporated into the polyurethane.

In a preferred embodiment, the polyurethane to be stabilized generally contains from 0.1 to 5% by weight, based on the total weight of the polyurethane, of antioxidant (i).

If the TPU to be stabilized is a polyether-TPU having a Shore hardness of less than Shore 54 D, the antioxidant (i) is usually used in concentrations of from 0.1 to 5, preferably from 0.1 to 2, particularly preferably from 0.5 to 1.5, % by weight, based on the total weight of the TPU.

If the TPU to be stabilized is a polyester-TPU or a polyether-TPU having a Shore hardness greater than or equal to Shore 54 D, the antioxidant (i) is usually used in concentrations of from 0.1 to 5, preferably from 0.1 to 1, particularly preferably from 0.2 to 0.75, % by weight, based on the total weight of the TPU.

The novel, stabilized TPU usually contains 0.01–2.5, preferably 0.05–1, particularly preferably 0.1–0.5, % by weight, based on the total weight of the TPU, of the component (ii).

Where the components (i) and (ii) are added in the form of a compound which combines the two components, this compound is generally used in an amount of 0.01–2.5, preferably 0.05–1, particularly preferably 0.1–0.5, % by weight, based on the total weight of the TPU. An antioxidant (component i) may then also be added, so that the concentration of component (i) corresponds to the preferred embodiment.

In a preferred embodiment, flameproofing agent, as component (iii) for reducing the flammability, may also be added to the TPU stabilized according to the invention and comprising the components (i) and (ii).

Suitable halogen-free flameproofing agents in addition to, for example, aluminum trihydrate and magnesium hydrate for particularly low-melting TPUs, are the triesters of phosphoric acid, such as trialkyl phosphates or triaryl phosphates, such as triphenyl phosphate. Oligomeric phosphoric esters or phosphonic esters and cyclic phosphates which are derived from pentaerythritol, neopentylglycol or pyrocatechol are particularly preferred. These phosphoric esters can be used alone or as mixtures with one another or as mixtures with phosphonic esters. Usually, however, phosphoric esters or phosphonic esters are used.

In a particularly suitable flameproofing combination, the phosphoric esters and/or phosphonic esters are used as mixtures together with one or more melamine derivatives for the TPU. In this case, the weight ratio of phosphate or phosphonate to melamine derivative is preferably from 5:1 to 1:5. Suitable melamine derivatives are preferably melamine cyanurate, melamine phosphate and melamine borate, particularly preferably melamine cyanurate.

However, it has surprisingly been found that in particular the use of melamine derivatives without addition of phosphoric esters gives a particularly suitable TPU for the production of film-laminated flat conductors and cable sheaths, and this embodiment is therefore preferred.

A large number of chlorinated or brominated compounds may be used as halogen-containing flameproofing agents. Effective flameproofing agents are, for example, chlorinated polyethylene, chlorinated cyclopentadiene adducts, decabromodiphenyl oxide, decabromobiphenyl, poly(tetrabromobisphenol A glycidyl ether) and poly(tetrabromobisphenol A carbonate) in combination with one another and/or with antimony(III) oxide as a synergistic agent and/or zinc borate. A number of other metal oxides, e.g. ZnO, $B_2O_3$, $Fe_2O_3$ or CaO, can also be added to the TPU in order to improve the flameproofing effect.

Polytetrafluoroethylene and silica in very small amounts are suitable for reducing the tendency to drip flaming particles.

The amounts of the component (iii) which, if required, is added for reducing the flammability vary greatly depending on the choice of the component, for example whether it is a halogen-containing or a halogen-free flameproofing agent. The additives (iii) of the preferred embodiment and the amounts in which they are used are described in EP-A-0617079 and EP-A-0189130.

The flameproofing agents are added to the TPU in general in an amount of from 0.1 to 60, preferably from 1 to 40, particularly preferably from 5 to 25, % by weight, based on the total weight of the stabilized TPU.

In a particularly preferred embodiment, melamine cyanurate is used as flameproofing component (iii), in an amount of 0.1–60, particularly preferably 5–40, in particular 15–25, % by weight.

The components (i), (ii) and, if required, (iii) can be used for stabilizing elastomeric polyurethane, in particular thermoplastic polyurethanes, or for the preparation of stabilized polyurethanes.

Thermoplastic polyurethane means that it is a polyurethane-based thermoplastic elastomer. A thermoplastic elastomer is an elastomer which remains thermoplastic when it is repeatedly heated and cooled in the temperature range typical for processing and use of the material. Thermoplastic is understood as meaning the property of a plastic of repeatedly softening at elevated temperature in a temperature range typical for it and of hardening on cooling and, in the softened state, being repeatedly moldable through flow as a molding, extrudate or shaped article to give semifinished products or articles.

Processes for the preparation of thermoplastic polyurethanes are generally known. In general, TPUs are prepared by reacting (a) isocyanates with (b) compounds reactive toward isocyanates and having a molecular weight ($M_w$) of from 500 to 10 000 and (c) chain extenders having a molecular weight of from 50 to 499, in the presence or absence of (d) catalysts and/or (e) conventional additives.

The starting components and processes for the preparation of the preferred polyurethanes are to be described below by way of example. The components (a), (b), (c) and, if required, (d) and/or (e) usually used in the preparation of the polyurethanes are to be described below by way of example:

a) Organic isocyanates (a) which may be used are generally known aliphatic, cycloaliphatic, araliphatic and/or aromatic isocyanates, for example tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethylbiphenyl 3,3'-diisocyanate, diphenylethane 1,2-diisocyanate and/or phenylene diisocyanate.

b) The generally known compounds reactive toward isocyanates may be used as compounds (b) reactive toward isocyanates, for example polyesterols, polyetherols and/or polycarbonatediols, which are usually also referred to together by the term polyols, having molecular weights of from 500 to 8 000, preferably from 600 to 6 000, in particular from 800 to less than 3 000, and preferably having an average functionality of from 1.8 to 2.3, preferably from 1.9 to 2.2, in particular 2. Polyetherpolyols, for example those based on generally known initiators and conventional alkylene oxides, for example ethylene oxide, propylene oxide and/or butylene oxide, are preferably used, particularly preferably polyetherols based on 1,2-propylene oxide and ethylene oxide and in particular polyoxytetramethylene glycols. The polyetherols have the advantage that they have a higher stability to hydrolysis than polyesterols.

Other polyetherols which may be used are those having a low degree of unsaturation. In the context of this invention, polyols having a low degree of unsaturation are understood as meaning in particular polyetheralcohols containing less than 0.02, preferably less than 0.01, meq/g of unsaturated compounds.

Such polyetheralchols are generally prepared by an addition reaction of alkylene oxides, in particular ethylene oxide, propylene oxide or a mixture thereof, with the diols or triols described above, in the presence of highly active catalysts. Such highly active catalysts are, for example, cesium hydroxide and multimetal cyanide catalysts, also referred to as DMC catalysts. A frequently used DMC catalyst is zinc hexacyanocobaltate. The DMC catalyst can be left in the polyetheralcohol after the reaction, but it is usually removed, for example by sedimentation or filtration.

Polybutadienediols having a molar mass of 500–10 000, preferably 1 000–5 000, in particular 2 000–3 000, g/mol may furthermore be used. TPUs prepared using these polyols can be radiation-crosslinked after thermoplastic processing. This leads, for example, to better burning behavior.

Instead of one polyol, it is also possible to use mixtures of different polyols.

c) Chain extenders (c) used are generally known aliphatic, araliphatic, aromatic and/or cycloaliphatic compounds having a molecular weight of from 50 to 499, preferably difunctional compounds, for example diamines and/or alkanediols having 2 to 10 carbon atoms in the alkylene radical, in particular 1,4-butanediol, 1,6-hexanediol and/or di-, tri-, tetra-, penta-, hexa-, hepta-, octa-, nona- and/or decaalkylene glycols of 3 to 8 carbon atoms, preferably corresponding oligo- and/or polypropylene glycols, it also being possible to use mixtures of the chain extenders.

The components a) to c) are particularly preferably difunctional compounds, i.e. diisocyanates (a), difunctional polyols, preferably polyetherols (b) and difunctional chain extenders, preferably diols.

d) Suitable catalysts which accelerate in particular the reaction between the NCO groups of the diisocyanates (a) and the hydroxyl groups of the components (b) and (c) are the conventional tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and in particular organic metal compounds, such as titanic esters, iron compounds, e.g. iron(III) acetylacetonate, tin compounds, e.g. tin diacetate, tin dioctanoate, tin dilaurate or the dialkyltin salts of aliphatic carboxylic acids, such as dibutyltin diacetate, dibutyltin dilaurate or the like. The catalysts are usually used in amounts of from 0.0001 to 0.1 part by weight per 100 parts by weight of polyhydroxy compound (b).

e) In addition to catalysts (d), conventional assistants and/or additives (e) may also be added to the components (a) to (c).

Examples are blowing agents, surface-active substances, fillers, nucleating agents, lubricants and mold release agents, dyes and pigments, if required further antioxidants which can be used in addition to the component (i), for example against hydrolysis, light, heat or discoloration, inorganic and/or organic fillers, reinforcing agents and plasticizers. In a preferred embodiment, the component (e) also includes hydrolysis stabilizers, for example polymeric and low molecular weight carbodiimides.

In addition to said components a), b) and c) and, if required, d) and e), chain regulators, usually having a molecular weight of from 31 to 499, may also be used. Such chain regulators are compounds which have only one functional group reactive toward isocyanates, e.g. monofunctional alcohols, monofunctional amines and/or monofunctional polyols. By means of such chain regulators, flow behavior, in particular in the case of TPUs, can be established in a controlled manner. Chain regulators can be used in general in an amount of from 0 to 5 parts by weight, preferably from 0.1 to 1 part by weight, based on 100 parts by weight of the component b), and by definition are included in the component c).

All molecular weights stated in this document have the unit [g/mol].

For establishing hardness of the TPUs, the components (b) and (c) can be varied within relatively wide molar ratios. Molar ratios of from 10:1 to 1:10, in particular from 1:1 to 1:4, for component (b) to the total amount of chain extenders (c) to be sed have proven useful, the hardness of the TPU increasing with increasing content of (c).

The reaction can be carried out at customary indices, preferably at an index of from 60 to 120, particularly preferably from 80 to 110. The index is defined by the ratio of the total amount of isocyanate groups of component (a) which are used in the reaction to those groups of the components (b) and (c) which are reactive toward isocyanates, i.e. the active hydrogen atoms. At an index of 100, there is one active hydrogen atom of the components (b) and (c), i.e. one function reactive toward isocyanates, per isocyanate group of the component (a). At indices above 100, more isocyanate groups are present than OH groups.

The TPU can be prepared by the known processes, either continuously, for example using reaction extruders or the belt process in the one-shot or prepolymer process, or batchwise by the known prepolymer process. In these processes, the components (a), (b), (c) and, if required, (d) and/or (e) which are reacted can be mixed with one another in succession or simultaneously, the reaction starting immediately.

In the extruder process, the components (a), (b), (c) and, if required, (d) and/or (e) are fed individually or as a mixture into the extruder, for example at from 100 to 280° C., preferably from 140 to 250° C., and are reacted. The TPU obtained is extruded, cooled and granulated.

After the synthesis, the TPU can, if required, be modified by compounding in an extruder. By means of this compounding, the TPU can be modified, for example, in its melt index or its granular form to meet the requirements.

The components (i)–(iii) can be metered in during the synthesis or the processing of the TPU. Concentrates which contain the components (i) and/or (ii) and/or (iii) can also be prepared and metered into the TPU during the processing.

The case in which the TPU is stabilized during the synthesis or compounding with component i) and, if required, component iii) and a concentrate of the component ii) is metered into the TPU during the processing is preferred.

Such a novel metal deactivator concentrate contains in general a TPU, preferably a polyether-TPU, and from more than 2.5 to 40, preferably from 3 to 20, particularly preferably from 4 to 10, % by weight, based on the total weight of the thermoplastic polyurethane, of metal deactivator (ii). In addition, the concentrate can, if required, also contain an antioxidant, preferably a phenolic antioxidant, usually in an amount of from 0.1 to 5, preferably from 0.5 to 2, % by weight.

The novel concentrate can be prepared by adding the metal deactivator (ii) and, if required, the antioxidant (i) to the TPU during the synthesis, or by melting a TPU in a batch kneader or in an extruder and adding the metal deactivator and, if required, the antioxidant to the TPU during the synthesis. The addition in an extruder, in particular a twin-screw extruder, is preferred.

The amount of this concentrate is preferably chosen so that the concentration of the component ii) in the TPU thus treated corresponds to the particularly preferred concentration for the component ii) in the TPU. Preferred concentrates are those which are metered into the TPU in an amount of 0.5–10, preferably 1–4, % by weight, based on the total amount of the TPU.

The processing of the TPUs prepared according to the invention which are usually present in the form of granules or powder, to give injection molded and extruded articles, for example the desired films, shaped articles, rollers, fibers, claddings in automobiles, hoses, cable connectors, bellows, trailing cables, cable sheaths, seals, belts or damping elements, is effected by conventional methods, for example injection molding or extrusion. Such injection molded or extruded articles may also consist of compounds containing the novel TPU and at least one further thermoplastic, in particular a polyolefin, polyester, polyether, polystyrene or styrene copolymer or polyoxymethylene. In particular, TPU prepared according to the invention can be used for the production of film-laminated flat conductors and for the sheathing of copper cables.

Film-laminated flat conductors are generally understood as meaning flat, flexible conductor strips which are composed of one or more, preferably parallel, metal strips which are incorporated between two films of plastic so that an insulation is produced. The dimensions of the film-laminated flat conductors are not limited. Usually, they have a length of from 5 cm to 100 m and a width of from 0.5 cm to 30 cm, depending on their use.

According to the present invention, the plastics films contain thermoplastic polyurethane. They preferably comprise thermoplastic polyurethane, particularly preferably the TPU stabilized according to the invention. The films generally have a thickness of from 1 µm to 5 mm, preferably from 10 µm to 1 mm, particularly preferably from 25 µm to 250 µm. The adhesion between films is usually achieved by heating and pressing and/or by the use of adhesives.

A suitable metal strip is in general any conductive material. However, metals such as iron, zinc, copper or alloys thereof are preferably used, particularly preferably copper. The metal strips generally have a thickness of from 1 to 500 µm, preferably from 10 to 250 µm, particularly preferably from 30 to 100 µm.

A plurality of processes are possible for the production of the novel film-laminated flat conductors. In a preferred embodiment, first two TPU films preferably coated on one side with adhesive are provided. Metal strips, for example 30–100 µm thick copper strips, are then incorporated or laminated between these two films. A preferred adhesive is a resistant adhesive.

In a further preferred embodiment, the film laminate is produced in one operation, by coextrusion of the TPU films with metal strips, preferably with the copper strips. The additional processing step of lamination is thus dispensed with.

It is furthermore possible to produce the novel film-laminated flat conductors by pressing the copper conductor into the TPU film.

The novel film-laminated flat conductors have a wide range of applications. They are preferably used as flexible conductors in means of transport, electrical articles and machines. Examples of suitable means of transport are motor vehicles, for example cars or trucks, railroad vehicles, aircraft or ships. Examples of electrical articles are household appliances, televisions, stereo systems, video recorders, computers and accessories, printers and accessories, copiers and accessories, scanners and accessories, switch cabinets and control systems. Examples of machines are packaging machines, robots, cutting machines, machine tools, injection molding machines, extruders, calenders, film blowing machines, CAD machines, milling units, punches, presses, turning machines, construction machines, e.g. diggers, wheel loaders, cranes, conveyor systems, industrial trucks, sorting machines, assembly lines, process monitoring systems and process control stations.

The examples which follow illustrate the invention.

EXAMPLE 1

Example 1 describes the preparation of a novel stabilized TPU by the manual casting method.

In order to simulate the large surface areas as exist in film-laminated flat conductors, copper powder was incorporated directly.

1 000 g of a polytetrahydrofuran having a molar mass of 1 000 g/mol (PTHF 1000) were heated to about 90° C. in a tinplate bucket. Antioxidant (component i; for amount see table 1) and 125 g of butanediol were then added while stirring. In addition, the amounts of copper powder (particle size 0.04 mm) and metal deactivator (ii) stated in table 1 were metered in. The solution was heated to 80° C. while stirring. 600 g of 4,4'-MDI were then added and stirring was carried out until the solution was homogeneous. Thereafter, the TPU was poured into a shallow dish and heated first for 10 minutes at 125° C. on a hotplate and then for 15 hours at 110° C. in an oven.

TABLE 1

| Experiment number | Antioxidant 1 | Amount | Antioxidant 2 | Amount | Metal deactivator | Amount | Cu |
|---|---|---|---|---|---|---|---|
| 1.1 | Irganox ® 1010 | 8 g | Irganox ® 1098 | 8 g | ADK Stab ® CDA 1 | 1.75 g | 5.2 g |
| 1.2 | Irganox ® 1010 | 8 g | Irganox ® 1098 | 8 g | AKD Stab ® CDA 6 | 1.75 g | 5.2 g |
| 1.3 | Irganox ® 1010 | 8 g | Irganox ® 1098 | 8 g | Irganox ® MD 1024 | 1,75 g | 5.2 g |
| 1.4 | Irganox ® 1010 | 8 g | Irganox ® 1098 | 8 g | Eastman ® Inhibitor | 1.75 g | 5.2 g |
| 1.5 | Irganox ® 1010 | 8 g | Irganox ® 1098 | 8 g | Palmarole ® MDA P10 | 1.75 g | 5.2 g |
| 1.6 | Irganox ® 1010 | 8 g | Irganox ® 1098 | 8 g | Palmarole ® MDA P11 | 1.75 g | 5.2 g |
| 1.7 | Irganox ® 1010 | 8 g | Irganox ® 1098 | 8 g | Hostanox ® OSP 1 | 1.75 g | 5.2 g |
| 1.8 | Irganox ® 1010 | 8 g | Irganox ® 1098 | 8 g | — | — | 5.2 g |

Irganox ® and Tinuvin ® are trade names of Ciba Spezialitätenchemie GmbH, Lampertsheim, Germany
ADK ® Stab and Palmarole ® MDA are trade names of Asahi Denka Kogyo K.K., Tokyo, Japan.
Eastman Inhibitor ® is a trade name of Eastman Chemical Company, Kingsport, TN, USA
Hostanox ® is a trade name of Clariant GmbH, Germany.

EXAMPLE 2

Example 2 describes the production of test plates and the aging tests.

The cast slabs from example 1 were granulated and injection molded to give 2 mm thick sheets. S2 test specimens were punched out of these injection-molded sheets. These test specimens were aged in an oven at 130° C. The test specimens were removed from the oven at predefined intervals and tested according to DIN 53504. The FIGURE shows the curve for the elongation at break for the samples according to examples 1.1 to 1.8. It is clear that the addition of metal deactivators improves the stability of the TPU.

Moreover, it is found that the preferred metal deactivators from experiments 1.1 and 1.2 have a particularly good effect.

EXAMPLE 3

Example 3 describes the preparation of a metal deactivator concentrate.

1 000 g of PTHF 1000 were heated to about 90° C. in a tinplate bucket. 8 g of Irganox® 1010 and 8 g of Irganox® 1098 and 125 g of butanediol were then added while stirring. In addition, 50 g of ADK Stab CDA 1® (experiment 3.1) and 50 g of ADK Stab CDA 6® (experiment 3.2) were metered in. The solution was heated to 80° C. while stirring. 600 g of 4,4'-MDI were then added and stirring was carried out until the solution was homogeneous. Thereafter, the TPU was poured into a shallow dish and heated first for 10 minutes at 125° C. on a hotplate and then for 15 hours at 110° C. in an oven.

EXAMPLE 4

Example 4 describes the production of a TPU film with the aid of a metal deactivator concentrate.

4% of a concentrate from example 3 were added to various polyether-TPU of the Elastollan® series and the granules were thoroughly mixed and then processed on a Dr. Collin Cill-Roll unit 136–350 and a 250 mm slot die. Experiments in which the novel stabilized TPU was not used are indicated by C. A film thickness of 50 μm was established. Both concentrates mentioned in example 3 can be readily incorporated. Table 2 gives information about the experiments carried out.

TABLE 2

| Experiment | TPU | Component (i) | Amount | Concentrate | Amount | Component (iii) |
|---|---|---|---|---|---|---|
| C 4.1 | 1154 D | Irganox ® 1125 | 0.5% by wt. | — | — | — |
| 4.2 | 1154 D | Irganox ® 1125 | 0.5% by wt. | 3.1 | 4% by wt. | — |
| 4.3 | 1154 D | Irganox ® 1125 | 0.5% by wt. | 3.2 | 4% by wt. | — |
| C 4.4 | 1185 A | Irganox ® 1125 | 1% by wt. | — | — | — |
| 4.5 | 1185 A | Irganox ® 1125 | 1% by wt. | 3.1 | 4% by wt. | — |
| 4.6 | 1185 A | Irganox ® 1125 | 1% by wt. | 3.2 | 4% by wt. | — |
| C 4.7 | 1154 D FHF | Irganox ® 1125 | 0.5% by wt. | — | — | yes |
| 4.8 | 1154 D FHF | Irganox ® 1125 | 0.5% by wt. | 3.1 | 4% by wt. | yes |
| 4.9 | 1154 D FHF | Irganox ® 1125 | 0.5% by wt. | 3.2 | 4% by wt. | yes |
| C 4.10 | 1185 A FHF | Irganox ® 1125 | 1% by wt. | — | — | yes |
| 4.11 | 1185 A FHF | Irganox ® 1125 | 1% by wt. | 3.1 | 4% by wt. | yes |
| 4.12 | 1185 A FHF | Irganox ® 1125 | 1% by wt. | 3.2 | 4% by wt. | yes |

Elastollan ® is the trade name of Elastogran GmbH, Lemförde, Germany.

EXAMPLE 5

Production of Film-Laminated Flat Conductors

Films whose production was described in example 4 were pressed between two copper sheets and heated at 110° C. in an oven. After 250 hours, the films were removed. Table 3 shows the extent to which the individual films have become discolored.

TABLE 3

| Experiment | TPU film | Discoloration |
|---|---|---|
| C 5.1 | 4.1 | Strongly yellowed |
| 5.2 | 4.2 | Slightly yellowed |
| 5.3 | 4.3 | Slightly yellowed |
| C 5.4 | 4.4 | Strongly yellowed |
| 5.5 | 4.5 | Slightly yellowed |

TABLE 3-continued

| Experiment | TPU film | Discoloration |
|---|---|---|
| 5.6 | 4.6 | Slightly yellowed |
| C 5.7 | 4.7 | Strongly yellowed |
| 5.8 | 4.8 | Slightly yellowed |
| 5.9 | 4.9 | Slightly yellowed |
| C 5.10 | 4.10 | Strongly yellowed |
| 5.11 | 4.11 | Slightly yellowed |
| 5.12 | 4.12 | Slightly yellowed |

It is clear that the films from the examples which contain no metal deactivators have a stronger yellow discoloration.

We claim:

1. A film-laminated flat conductor, comprising:
   thermoplastic polyurethane films; and
   at least one metal strip between said films,
   wherein said thermoplastic polyurethane is a stabilized thermoplastic polyurethane (TPU) comprising
   (i) 0.1 to 5% by weight of one or more phenolic antioxidants and
   (ii) 0.01 to 2.5% by weight of one or more metal deactivators selected from the group consisting of triazole derivatives of salicylaldehyde and hydrazine derivatives of salicylaldehyde, based on the total weight of the TPU,
   wherein the triazole derivatives of salicylaldehyde and hydrazine derivatives of salicylaldehyde have the following formula 4:

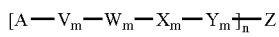

wherein A is a salicylaldehyde radical according to formula 4.2:

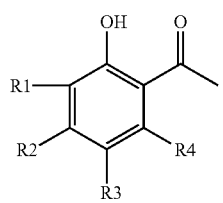

wherein R1–R4, independently of one another, are H; OH, halogen. $NO_2$, $NH_2$, a linear, branched or cyclic C1–C12 alkyl radical, a linear, branched or cyclic C1–C12 alkenyl, a linear, branched or cyclic C1–C12 alkynyl radical or haloalkyl radical, a linear, branched or cyclic C1–C12 alkoxy radical, a linear, branched or cyclic C1–C12 alkylamino radical, containing primary and/or secondary and/or tertiary amines, a linear, branched or cyclic C1–C12 alkylthio radical or a linear, branched or cyclic C1–C12 alkoxycarbonyl radical, $V_m$ is a triazole radical according to formula 4.3:

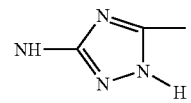

or a hydrazine radical according to formula 4.4:

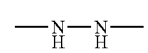

$W_m$ and $Y_m$ are absent or, independently of one another are a carbonyl group, $X_m$ is absent or is a hydrogen atom, a linear or branched C1–C30 alkylene radical, a linear, branched or cyclic C1–C30 alkenyl radical, a linear, branched or cyclic C1–C30 alkynylene radical, a linear, branched or cyclic C1–C30 alkoxy radical or a linear, branched or cyclic C1–C30 alkylamino radical containing primary amino groups, z is optional and is a hydrogen atom, a halogen atom, a carbon atom, an oxygen atom, a sulfur atom, a nitrogen atom, an $NH_{3-o}$ group, a phosphorus atom, a methyl radical, a methenyl radical, a methynyl radical, a monovalent, divalent or trivalent to hexavalent diol radical, a triol radical, a polyol radical having a higher OH than 3 functionality, or an amino alcohol or diamine radical, n is an integer from 1 to 6, m is an integer from 1 to n, and o in the expression $NH_{3-o}$ is an integer from 1 to 3.

2. A process for the production of said film-laminated flat conductor as claimed in claim 1, the process comprising:
   providing two thermoplastic polyurethane (TPU) films and then incorporating metal strips between said two films or coextruding TPU films with one or more metal strips.

3. A method of preparing a means of transport, an electrical apparatus or a machine, said method comprising:
   preparing said film-laminated flat conductor as claimed in claim 1 in the form of said means of transport, said electric apparatus or said machine.

4. An electrical apparatus, machine and/or means of transport comprising said film-laminated flat conductor as claimed in claim 1.

5. The film-laminated flat conductor as claimed in claim 1, comprising:
   two thermoplastic polyurethane films; and
   at least one metal strip laminated between said two films.

6. The film-laminated flat conductor as claimed in claim 1, comprising:
   thermoplastic polyurethane films coextruded with metal strips.

7. The film-laminated flat conductor as claimed in claim 1, further comprising (iii) one or more flameproofing agents.

8. The film-laminated flat conductor as claimed in claim 1, comprising:
   two films of thermoplastic polyurethane adhering to one another, a metal strip or a plurality of metal strips having a thickness of from 1 to 500 μm being laminated between said films.

9. The film-laminated flat conductor as claimed in claim 1, wherein $V_m$ is a triazole radical according to formula 4.3.

10. The film-laminated flat conductor as claimed in claim 1, wherein $V_m$ is a hydrazine radical according to formula 4.4.

11. The film-laminated flat conductor as claimed in claim 1, wherein said films have a thickness of from 25 to 250 μm.

12. A film-laminated flat conductor, comprising:

thermoplastic polyurethane films; and at least one metal strip between said films, wherein said thermoplastic polyurethane is a stabilized thermoplastic polyurethane (TPU) comprising (i) 0.1 to 5% by weight of one or more phenolic antioxidants and (ii) 0.01 to 2.5% by weight of:

a compound of the formula:

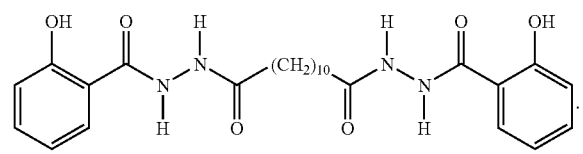

or a compound of the formula:

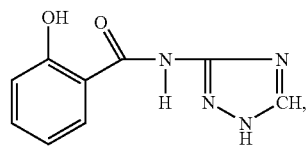

as a metal deactivator.

13. The film-laminated flat conductor as claimed in claim 12, wherein component (ii) has the following formula:

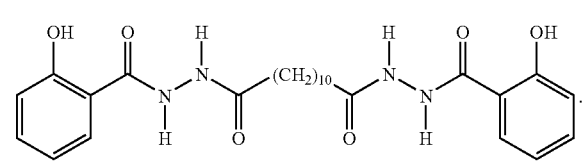

14. The film-laminated flat conductor as claimed in claim 12, wherein component (ii) has the following formula:

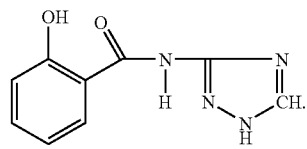

* * * * *